United States Patent [19]

Kessler

[11] Patent Number: 4,948,637

[45] Date of Patent: Aug. 14, 1990

[54] RUB RAIL END CAPS

[76] Inventor: Gerald Kessler, 302 McClurg Rd., P.O. Box 389, Youngstown, Ohio 44512

[21] Appl. No.: 389,648

[22] Filed: Aug. 4, 1989

[51] Int. Cl.⁵ .......................... E04F 19/02; B60J 11/00
[52] U.S. Cl. .......................... 428/31; 428/57; 428/99; 52/716; 293/128
[58] Field of Search ............... 428/31, 57, 99; 52/716; 293/128

[56] References Cited

U.S. PATENT DOCUMENTS

| | | |
|---|---|---|
| 3,359,030 | 12/1967 | Newman . |
| 3,388,523 | 6/1968 | Evans . |
| 3,451,709 | 6/1969 | Swauger . |
| 3,506,294 | 4/1970 | Newman . |
| 3,843,475 | 10/1974 | Kent . |
| 4,059,938 | 11/1977 | Aimar . |
| 4,066,285 | 1/1978 | Hall et al. . |
| 4,083,592 | 4/1978 | Rubin et al. . |
| 4,161,853 | 7/1979 | Weiss et al. . |
| 4,181,764 | 1/1980 | Totten . |
| 4,531,339 | 7/1985 | Tomaszewski et al. . |
| 4,592,127 | 6/1986 | Simon . |
| 4,617,209 | 10/1986 | Ives . |
| 4,808,451 | 2/1989 | McCue et al. . |

Primary Examiner—Alexander S. Thomas
Attorney, Agent, or Firm—Browdy & Neimark

[57] ABSTRACT

An improved end cap for a rub rail is formed of two pieces, namely an inner part and an outer part. The inner part is appropriately connected to the channel strip base and has an abutment surface which underlays the end of the rub rail. The second or outer part has a squeezing surface which overlays the end of the rub rail. A screw or the like tightly attaches the outer part to the inner part and in so doing squeezes the end of the rub rail between the abutment surface and the squeezing surface thereby tightly capturing such end of the rub rail and providing a secure and decorative assembly.

8 Claims, 2 Drawing Sheets

RUB RAIL END CAPS

FIELD OF THE INVENTION

The present invention relates to a rub rail assembly of the kind adapted to protect wall surfaces and the like from abrasions or impacts and which typically include an extruded rub rail, a channel support member for the rub rail, and a protective end cap. More particularly, the invention relates to a multi-sectioned end cap for such an assembly having a first section for attachment thereof to the channel support member and a second section for capturing and securing the end of the extruded rub rail to the first section of the end cap.

BACKGROUND OF THE INVENTION

Rub rail assemblies of the kind with which the present invention is concerned typically include a somewhat shock absorbent extruded rub rail, made of a material such as rubber or resilient plastic, and an extruded metal channel strip support to which the rub rail is appropriately attached. Rub rail assemblies of this kind are used principally to protect wall surfaces, equipment, etc. which in ordinary use are subjected to repeated frequent and abusive impacts or abrasions, such as vehicle doors and fenders, marine docks, supermarket checkout counters and cases including refrigeration-cases, shelving, display tables, refrigeration equipment, etc.

Typically, rub rail assemblies known today (see FIG. 1 of the drawings and the patents to Rubin et al U.S. Pat. Nos. 4,083,592 and McCue et al 4,808,451) include a rub rail supporting channel strip 1, and a hard rubber or plastic rub rail extrusion 2 secured to the channel strip by means of a pair of hollow leg members 3,4 or other such interlocking elements. A metal end cap 10 having a protective shell 12 is located at and attached to each end of the channel strip 1 via the insertion of a pin member 14 into a recess 8 of the channel strip 1. Each of the hollow leg members of the rub rail extrusion are deformably engaged with a correspondingly configured rigid jaw 5,5' or 6,6' disposed on the channel strip. The channel strip 1, like the impact absorbing rub rail extrusion 2, is typically provided as an elongated member, with the rub rail 2 overlying the channel strip and being cut or otherwise terminated in a length which is substantially the same length as the channel strip or in a plurality of pieces.

The end caps 10 are generally employed to cover the ordinarily unsightly, unfinished, approximately aligned, overlying ends of the channel strip and the rub rail extrusion, as well as to provide the entire rub rail assembly with a tailored and aesthetically pleasing appearance. The end caps 10 also anchor the ends of the rub rail 2 to the channel strip 1.

One of the more common problems encountered in the use of end caps with rub rail assemblies is that the heights of the installed rub rails and end caps are normally not the same. It is not commercially possible to produce rub rail extrusions with a consistent excellent appearance in various colors using, as necessary, an unbalanced die, while at the same time providing close dimensional tolerances, unless a very rigid plastic is used; however, the use of rigid plastic is successful only if very expensive plastic such as polycarbonate is used. In particular, it would be desirable to have the height of the rub rail extrusion equal to, or exceed by no more than from about 0.005" to about 0.015", the height of the end cap while using inexpensive, shock absorbent plastic. The industry's present manufacturing processes do not lend themselves to providing components, both end caps and rub rail extrusions, with heights that consistently fall within the tolerance ranges considered necessary for uniformity in this industry.

OBJECTS AND SUMMARY OF THE PRESENT INVENTION

It is therefore an object of the invention to overcome or at least alleviate deficiencies in the prior art, such as mentioned above.

It is another object of the present invention to provide an inexpensive rub rail assembly having improved end caps.

It is a further object of the present invention to provide a rub rail assembly wherein the end caps can be secured to the rub rail extrusions within predetermined, relatively small dimensional tolerances heretofore not achieved.

Yet another object of the present invention is to provide an end cap subassembly which will secure the terminations of the rub rail extrusions against snagging on passing objects or pulling away from the underlying channel strip.

Still another object of the invention is to provide an end cap which is simple in construction, inexpensive to manufacture, and easy to use.

Yet a further object is to provide an end cap which possesses an aesthetically pleasing appearance, and which contributes to an aesthetically pleasing appearance of the entire rub rail assembly when secured, along with the rub rail extrusion, to the underlying channel strip.

These and other objects and advantages are achieved by the provision of an end cap consisting of a first part securable to the channel strip, and a second part disposable atop and securable to the first part, where the first and second parts of the end cap cooperate to receive therebetween the thickness of the rub rail extrusion. By this arrangement, the first and second parts of the end cap, as well as the rub rail extrusion, are all secured to the channel strip with the height of the second, outer part of the end cap being only slightly greater than the height of the rub rail extrusion.

BRIEF DESCRIPTION OF THE DRAWINGS

In order that the invention may be more readily understood, reference will now be made to the accompanying drawing, which except for Figures 1 and 2 illustrate embodiments of the invention.

DETAILED DESCRIPTION OF THE PRESENT INVENTION

Figure 1:
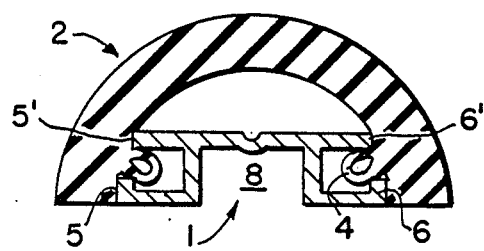
FIGS. 1 and 2 illustrate one example of a rub rail assembly typical of those currently used today, with FIG. 1 being a cross-sectional view of the assembly shown in perspective in FIG. 2.
Figure 2:
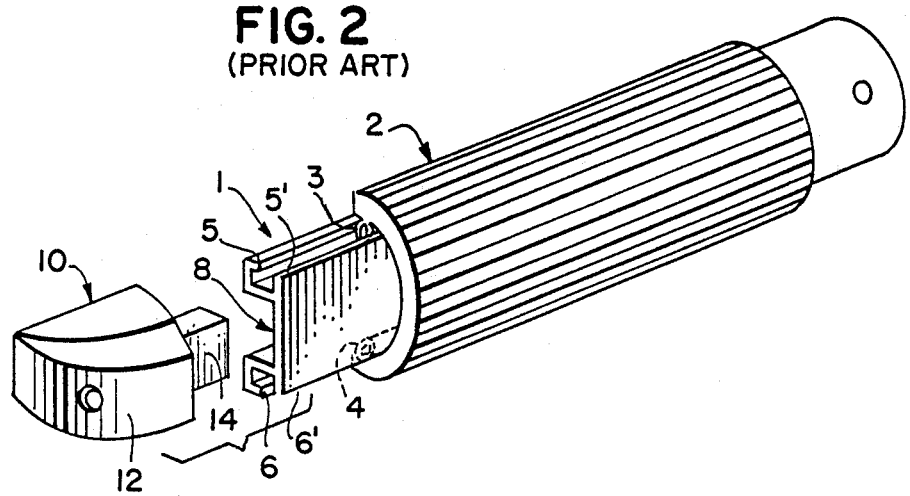
Figure 3:
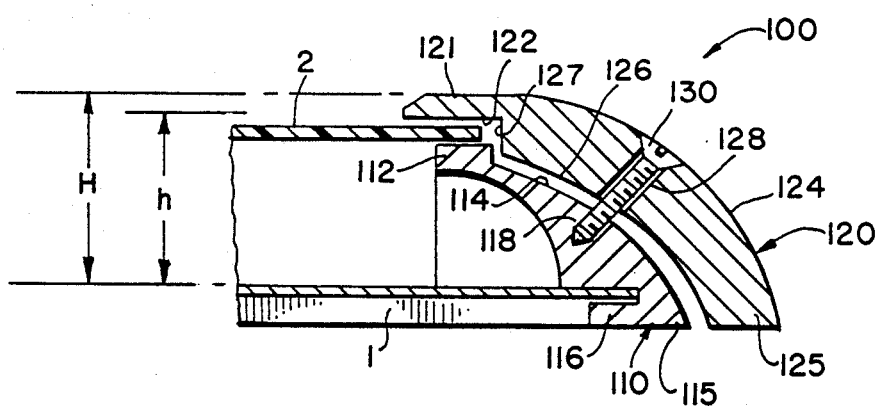
FIG. 3 is a longitudinal cross-sectional view of a rub rail assembly in accordance with the present invention, the sectional view being taken in a plane bisecting the rub rail and its channel strip support.
Figure 4:
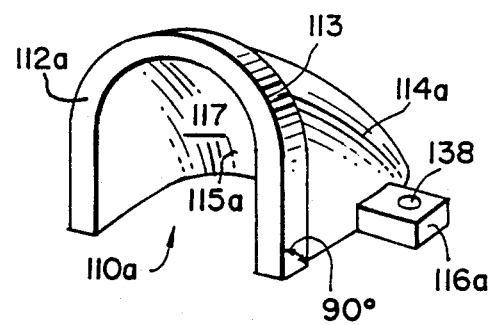
FIG. 4 is a perspective view of a preferred embodiment of an inner part of the end cap of the present invention.

Referring now to FIGS. 3 and 4, there is shown a first embodiment of a dual-part end cap 100 in accordance with the present invention, which includes a first inner part 110 and a second outer part 120. The inner part 110 includes an arcuate, substantially semi-cylindrical land 112 upon which one termination of the rub rail extrusion 2 is seated. Extending rearwardly of the land 112 is a gently sloping outer surface 114 generally defining a quarter-sphere and which terminates in a base portion 115 having a lower face substantially parallel with the bottom of the channel strip The base portion 115 carries at least one forwardly projecting prong member 116 which is engaged within a complimentarily configured recess in the end of channel strip 1; thus, if the channel strip 1 has the same configuration as shown in FIGS. 1 and 2, the prong 116 can fit within the recess 8, or three prongs can be provided with the outer two fitting within the recesses defined by the jaws 5, 5' and 6, 6', or only the two outer prongs may be present. A threaded bore 118, provided in a central region of the outer face 114 of the first inner part 110, is adapted for threaded engagement with an appropriate threaded fastener as described below.

Figure 5:
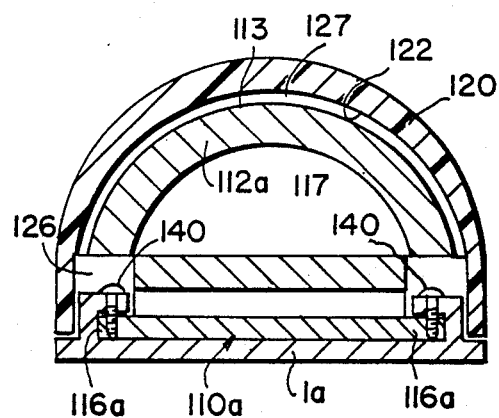
FIG. 5 is a sectional view of the dual part end cap taken along line 5—5 of FIG. 6 and incorporating the inner part illustrated in FIG. 4.
Figure 6:
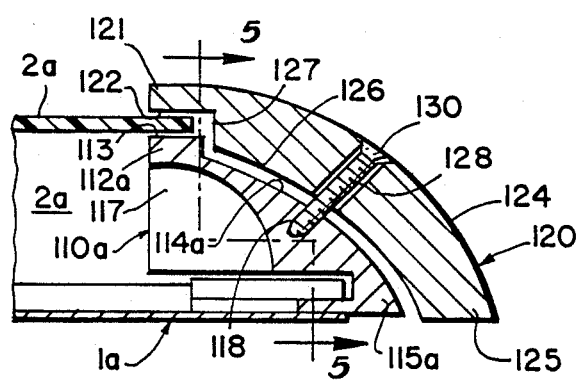
FIG. 6 is a view similar to FIG. 3, showing use of the inner part of FIGS. 4 and 5.

A variation 110a of the inner part 110 of FIG. 3 is shown in FIG. 4 in perspective, with an arcuate land 112a of generally semi-cylindrical form having an upper surface 113 for abutting beneath the end of the rub rail 2a as shown in FIG. 6, and a base 115a for resting on the channel strip. Outer and inner surfaces 114a and 117 are desirably quarter-spherical, and a pair of outwardly extending ledges 116a are adapted to interengage with a differently configured base channel strip la of the type disclosed in FIG. 3 of copending application Ser. No. 320,447, the contents of which are hereby incorporated by reference. The engagement between the ledges 116a and the channel strip 1a may be entirely frictional, or screws 140 may be used as shown in FIG. 5. Alternatively, an adhesive sealant can be used to permanently anchor the ledges 116a to the base channel strip. If screws or the like are used, they are driven through the rub rail securing means of the channel strip member and then into the receiving holes 138 which may be internally threaded; if the screws 140 are self-tapping, the holes need not be initially internally threaded.

Returning to FIG. 3 and also considering the alternative of FIG. 6, the end cap second part 120 includes a first forward end or lip 121 formed with an arcuate, substantially semi-cylindrical land 122 which circumscribes in fairly close proximity the arcuate land 112 of the end cap first part 110 and ends in an arcuate shoulder 127. The outer or second part 120 has a rearwardly or outer facing surface 124 fashioned desirably with a substantially quarter-spherical streamlined contour, and with a base portion 125 terminating in a surface disposed in a plane which is substantially parallel to the plane of the channel strip 1 or 1a wall-engaging surface. A forwardly facing surface 126 of the end cap second part 120 is configured complementary to and to closely receive the rearwardly facing surface 114 of the end cap first part 110. Located substantially centrally of the rearwardly facing surface 124, and in concentric relationship with the threaded bore 118 of the end cap first part 110, is a threaded through-bore 128 which includes an enlarged entry for accommodating the head of a threaded fastener 130 below the surface 124.

FIG. 5 is a sectional view along line 5—5 of FIG. 6 showing the assembly from the inside and partly in section looking toward the end cap, with the concave inner surface 117 of the inner part 110a located at the center.

Capture and retention of the terminal region of the rub rail 2 or 2a is achieved in accordance with the present invention by provision of the so-described dual part end cap structure. Thus, the terminal end of the rub rail 2 or 2a is fitted between the first and second lands 112,122 or 112a, 122 of the end cap first and second parts 110,120 or 110a, 120 when these parts are fitted together. More particularly, the rub rail is first installed on the channel strip base, then the inner part 110 or 110a is installed on the channel strip 1 or 1a with its arcuate land 112 or 112a beneath the lip of the rub rail 2 or 2a as shown in FIGS. 3 and 5, and finally the outer part 120 is placed thereover also as shown in FIGS. 3 and 5. Upon insertion of the threaded fastener 130 in the coaxially aligned bores 118,128 and subsequent tightening of the first part 110 or 110a and second end cap part 120, the abutment surface 113 of the land 112 or 112a and the squeezing surface 122 are brought to bear on opposite sides of the terminal region or lip of the rub rail 2 or 2a. In this manner, the rub rail and the end cap are securely held in an attractive and consistent manner on the channel strip with the end cap second part 120 having a height H slightly greater than the height h of the rub rail assembly.

Figure 7:
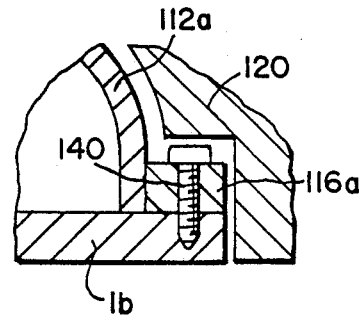
FIG. 7 is a broken-away partial view which illustrates a variation for attachment of the end cap inner part to the channel strip which is an alternative to the attachment arrangement shown in FIGS. 4–6.

FIG. 7 schematically shows a variation of the inner part where the attachment flanges or ledges 116a rest above upwardly extending parts 1b of the channel strip base. Screws 140 or the like extend downwardly first through holes in the ledges 116a and then into the channel strip structure 1b.

The end cap of the present invention may be formed of metal such as by die-casting or of suitably strong plastic such as toughened nylon, ABS polymer, polyacetal resin, PVC etc., formed preferably by injection molding. Moreover, the aesthetic appeal of the end cap may be enhanced by the addition of a coloring substance, such as a dye or pigment, to the material of which at least the second outer part of the end cap is made.

While certain preferred embodiments having particularly shaped members have been shown and described herein, it will be understood that there is no intent to limit the invention by such disclosure, but rather it is intended to cover all modifications and alternate constructions falling within the spirit and scope of the invention. Thus, it will be understood that many variations are possible without departing from the invention. For example, while the forward end or lip 121 of the second or outer part 120 is illustrated as being relatively thick, this dimension can be controlled to provide various aesthetic effects, and indeed the land 122 can be tapered to a fine lip edge. Similarly, the outside surface 124 of the outer part 120 can be molded to any selected shape or configuration to provide a desired aesthetic effect. Various other means of attachment of the inner part to the channel strip can be provided, such as hook or snap elements on the inner part which cooperate with complimentary openings or the like on the base channel strip.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and rang of equivalents of the disclosed embodiments. It is to be understood that the phraseology or terminology employed herein is for the purpose of description and not of limitation.

What is claimed is:

1. An end cap adapted to decoratively secure the terminal end of a laterally arcuate decorative trim strip to a surface-mounted channel strip, said trim strip being of the type having a first inner surface facing said channel strip and a second oppositely facing outer surface, said end cap comprising:
   a first body member having a generally quarter-spherical outer surface, said first body member being securely attachable to said channel strip and including an arcuate abutment surface for engagement with said trim strip first surface,
   a second body member having an inner surface configured for receiving the outer surface of said first body member in close spaced relationship therewith, said second body member having an arcuate squeezing surface adapted to overlay the arcuate abutment surface of said first body member, for capturing and securing the terminal end of said decorative trim strip,
   said first and second body members each carrying cooperating means for diminishing the spacing between said inner surface of said second body member and the outer surface of said first body member,
   whereby as said spacing between the first and second body members is diminished, the terminal end of said trim strip is squeezed between said abutment surface and said squeezing surface, and is securely retained in a predesired position relative to the channel strip.

2. An end cap according to claim 1 wherein at least one of said first body member and said second body member is formed of high-strength plastic.

3. An end cap according to claim 1 wherein said first body member comprises screw means for effecting said secure attachment to said channel strip.

4. An end cap according to claim 1 wherein said cooperating means for diminishing the spacing between said inner surface of said second body member and the outer surface of said first body member comprises a threaded rod.

5. A rub rail assembly comprising a channel strip base, a rub rail supported on said base and having a first inner surface facing said channel strip base and a second oppositely facing outer surface, and an end cap attached to an end of said base channel strip and rub rail, the improvement wherein said end cap comprises;
   a first body member having a generally quarter-spherical outer surface, said first body member being securely attached to said channel strip base and including an arcuate abutment surface for engagement with said rub rail first surface,
   a second body member having an inner surface configured for receiving the outer surface of said first body member in closely spaced relationship therewith, said second body member having an arcuate squeezing surface overlaying the arcuate abutment surface of said first body member and capturing and securing the end of said rub rail therebetween,
   said first and second body members each carrying cooperating means for diminishing the spacing between said inner surface of said second body member and the outer surface of said first body member, whereby as said spacing between the first and second members is diminished, the captured end of said rub rail is squeezed between said abutment surface and said squeezing surface and is securely retained therebetween.

6. An end cap according to claim 5 wherein at least one of said first body member and said second body member is formed of high-strength plastic.

7. An end cap according to claim 5 wherein said first body member comprises screw means for effecting said secure attachment to said channel strip.

8. An end cap according to claim 5 wherein said cooperating means for diminishing the spacing between said inner surface of said second body member and the outer surface of said first body member comprises a threaded rod.

* * * * *